(12) United States Patent
Shen et al.

(10) Patent No.: US 10,924,301 B2
(45) Date of Patent: Feb. 16, 2021

(54) NETWORK CONTROL DEVICE, COMMUNICATION SYSTEM, NETWORK CONTROL METHOD, PROGRAM, AND RECORDING MEDIUM

(71) Applicant: NTT Communications Corporation, Chiyoda-ku (JP)

(72) Inventors: Wenyu Shen, Yokohama (JP); Ryu Kanishima, Koutou-ku (JP); Kenji Arai, Sumida-ku (JP); Takeo Saga, Adachi-ku (JP); Takayuki Kamei, Funabashi (JP)

(73) Assignee: NTT Communications Corporation, Chiyoda-ku (JP)

( * ) Notice: Subject to any disclaimer, the term of this patent is extended or adjusted under 35 U.S.C. 154(b) by 0 days.

(21) Appl. No.: 16/345,138

(22) PCT Filed: Aug. 30, 2017

(86) PCT No.: PCT/JP2017/031144
§ 371 (c)(1),
(2) Date: Apr. 25, 2019

(87) PCT Pub. No.: WO2019/043827
PCT Pub. Date: Mar. 7, 2019

(65) Prior Publication Data
US 2019/0288875 A1    Sep. 19, 2019

(51) Int. Cl.
*H04L 12/54*    (2013.01)
*H04L 12/46*    (2006.01)
(Continued)

(52) U.S. Cl.
CPC ...... *H04L 12/5691* (2013.01); *H04L 12/4633* (2013.01); *H04L 12/4641* (2013.01);
(Continued)

(58) Field of Classification Search
CPC . H04L 12/5691; H04L 45/04; H04L 12/4633; H04L 12/4641; H04L 12/66;
(Continued)

(56) References Cited

U.S. PATENT DOCUMENTS 7,673,048 B1 * 3/2010 O'Toole, Jr. ............ H04L 12/66
 709/226
2005/0163096 A1   7/2005 Momona
(Continued)

FOREIGN PATENT DOCUMENTS

JP    2004-104664 A    4/2004
JP    2004-159146 A    6/2004
(Continued)

OTHER PUBLICATIONS

Extended European Search Report dated Jul. 3, 2019 in European Patent Application No. 17923954.6, 9 pages.
(Continued)

*Primary Examiner* — Ivan O Latorre
(74) *Attorney, Agent, or Firm* — Oblon, McClelland, Maier & Neustadt, L.L.P.

(57) ABSTRACT

Disclosed is a network control device for performing control of a system including a plurality of terminals and including a plurality of gateway devices that are coupled to a predetermined network, the network control device including a selection unit that selects a first gateway device used by a first terminal based on a quality between the first terminal and the plurality of gateway devices, a tunnel establishing unit that connects between the first terminal and each of other terminals that uses the first gateway device via a tunnel, and a path control unit that performs path control, such that, when a second gateway device used by a second terminal that is a communication destination of the first terminal is same as the first gateway device, traffic from the
(Continued)

first terminal to the second terminal is routed through a tunnel between the first terminal and the second terminal, and when the second gateway device is different from the first gateway device, traffic from the first terminal to the second terminal is routed through the predetermined network.

10 Claims, 17 Drawing Sheets

(51) Int. Cl.
*H04L 12/66* (2006.01)
*H04L 12/715* (2013.01)
*H04L 12/741* (2013.01)
*H04L 12/70* (2013.01)

(52) U.S. Cl.
CPC .............. *H04L 12/66* (2013.01); *H04L 45/04* (2013.01); *H04L 45/64* (2013.01); *H04L 45/745* (2013.01); *H04L 2012/5624* (2013.01)

(58) Field of Classification Search
CPC .................. H04L 45/64; H04L 45/745; H04L 2012/5624
See application file for complete search history.

(56) References Cited

U.S. PATENT DOCUMENTS

| | | | |
|---|---|---|---|
| 2009/0031415 A1 | 1/2009 | Aldridge et al. | |
| 2011/0231654 A1* | 9/2011 | Somadder | H04L 12/5691 713/153 |
| 2012/0057489 A1 | 3/2012 | Shiotsuki et al. | |
| 2013/0166759 A1 | 6/2013 | Rajamani et al. | |

FOREIGN PATENT DOCUMENTS

| | | |
|---|---|---|
| JP | 2005-39744 A | 2/2005 |
| JP | 2006-211360 A | 8/2006 |
| JP | 2007-135171 A | 5/2007 |
| JP | 2007-329549 A | 12/2007 |
| JP | 2010-258852 A | 11/2010 |
| JP | 2013-523021 A | 6/2013 |
| JP | 2015-503859 A | 2/2015 |
| WO | WO 03/092189 A1 | 11/2003 |

OTHER PUBLICATIONS

Lacharite, Y., et al.. "Hierarchical OLSR; draft-lacharite-manet-holsr-02.txt", Mobile Ad Hoc Networking (MANET), Communications Research Centre Minet, Hierarchical OLSR; Internet Engineering Task Force, IETF, No. 2, Jul. 13, 2009, XP015063507, pp. 1-38.

International Search Report dated Nov. 28, 2017 in PCT/JP2017/031144 filed on Aug. 30, 2017.

Japanese Office Action dated Apr. 12, 2018 in Patent Application No. 2018-513384.

Japanese Office Action dated Jul. 30, 2018 in Patent Application No. 2018-513384.

Imai, N. et al., "Coordination Route Control Method for Data Traffic Offload", The Institute of Electronics, Information, and Communication Engineers, IEICE Technical Report, 2010, 8 pages.

Office Action dated Oct. 1, 2020 in European Application No. 17 923 954.6.

* cited by examiner

FIG.6

| VPN TERMINAL | VPN GW | QUALITY |
|---|---|---|
| VPN TERMINAL A | VPN GATEWAY E | 10 ms |
| VPN TERMINAL A | VPN GATEWAY F | 20 ms |

FIG.7

| DESTINATION | Next-hop |
|---|---|
| B.B.B.B/B | VPN TERMINAL B |
| C.C.C.C/C | VPN GATEWAY E |
| D.D.D.D/D | VPN GATEWAY E |

FIG.8

| DESTINATION | Next-hop |
|---|---|
| A.A.A.A/A | VPN TERMINAL A |
| B.B.B.B/B | VPN TERMINAL B |
| C.C.C.C/C | VPN GATEWAY F |
| D.D.D.D/D | VPN GATEWAY F |

FIG.9

| DESTINATION | Next-hop |
|---|---|
| A.A.A.A/A | VPN GATEWAY E |
| B.B.B.B/B | VPN GATEWAY E |
| C.C.C.C/C | VPN TERMINAL C |
| D.D.D.D/D | VPN TERMINAL D |

FIG.12

| VPN TERMINAL | VPN TERMINAL | QUALITY |
|---|---|---|
| VPN TERMINAL A | VPN GATEWAY E | 10 ms |
| VPN GATEWAY E | VPN GATEWAY F | 100 ms |
| VPN GATEWAY F | VPN TERMINAL C | 20 ms |
| | | |

FIG.13

| VPN TERMINAL | VPN TERMINAL | QUALITY |
|---|---|---|
| VPN TERMINAL A | VPN TERMINAL C | 100 ms |

| DESTINATION | Next-hop |
|---|---|
| B.B.B.B/B | VPN TERMINAL B |
| C.C.C.C/C | VPN GATEWAY E |
| D.D.D.D/D | VPN GATEWAY E |
| 0.0.0.0/0 | VPN GATEWAY E |

FIG.17

| DESTINATION | Next-hop |
|---|---|
| A.A.A.A/A | VPN TERMINAL A |
| B.B.B.B/B | VPN TERMINAL B |
| C.C.C.C/C | VPN GATEWAY F |
| D.D.D.D/D | VPN GATEWAY F |
| 0.0.0.0/0 | SECURITY FUNCTION G |

| DESTINATION | Next-hop |
|---|---|
| A.A.A.A/A | VPN TERMINAL A |
| B.B.B.B/B | VPN TERMINAL B |
| C.C.C.C/C | WAN ACCELERATION FUNCTION J |
| D.D.D.D/D | WAN ACCELERATION FUNCTION J |

FIG.22

| DESTINATION | Next-hop |
|---|---|
| H.H.H.H/H | VPN GATEWAY E |
| I.I.I.I/I | VPN GATEWAY E |

FIG.23

| DESTINATION | Next-hop |
|---|---|
| H.H.H.H/H | VPN GATEWAY F |
| I.I.I.I/I | VPN GATEWAY F |

FIG.24

| DESTINATION | Next-hop |
|---|---|
| H.H.H.H/H | SaaS H |
| I.I.I.I/I | Cloud I |

NETWORK CONTROL DEVICE, COMMUNICATION SYSTEM, NETWORK CONTROL METHOD, PROGRAM, AND RECORDING MEDIUM

TECHNICAL FIELD

The present invention relates to network control technologies in a network such as a SD-WAN.

BACKGROUND ART

SD-WAN (Software-defined WAN) technology has been proposed by a group called ONUG (Open Networking Group) that is mainly established by IT managers responsible for companies such as large financial firms, distribution companies or retailers in North America. With the aim of reduced costs of an existing WAN, a simplified operation, an improved quality and the like, many corporate users have started introducing a commercially available SD-WAN solution. With the emergence of the SD-WAN, a corporate WAN appears to be greatly changed as well.

First, communication performed between branches gradually is offloaded from a MPLS network to the Internet network. A configuration of business traffic being routed through the MPLS network and further other traffic being routed through the Internet network is becoming a de facto standard. There is an increase in companies of which a part of the branches configure connections by Internet only.

Second, a connection to the public cloud that is provided by leading software companies, leading e-commerce companies or the like is also increasing rapidly. With use of virtual CPE (customer premises equipment), many SD-WAN solutions are coupled to the public cloud by directly establishing an overlay tunnel with respect to physical CPE located in a branch. Also, there is increased demand for Local Internet breakout mainly for SaaS access.

CITATION LIST

Patent Literature

[PTL 1] Japanese Laid-Open Patent Publication No. 2007-329549

SUMMARY OF INVENTION

Technical Problem

However, there are still many issues in introducing and operating the existing SD-WAN. Among them, the issue of a network quality is particularly pointed out by a search conducted by the IDC, for example.

In an SD-WAN, the overlay tunnel is established on the Internet, and thus traffic routed through the overlay is increased. For this reason, for example, in accordance with routing between ISPs, latency between branches is larger than expected, or alternatively, large packet loss occurs in accordance with an area, an ISP or time of day. In addition, with the growing use of a remote desktop, a telephone system, or an application such as file sharing, demands for bandwidths are increased.

The present invention addresses the above point, and an object of the present invention is to provide techniques for improving a quality between a plurality of branches in a connection manner that varies according to an arrangement of a plurality of branches intended for the connection, in implementing a network connection between the plurality of branches.

Solution to Problem

According to disclosed techniques, a network control device is provided, the network control device configured to perform control of a system including a plurality of terminals and including a plurality of gateway devices that are coupled to a predetermined network, the network control device including:

a selection unit that selects a first gateway device used by a first terminal based on a quality between the first terminal and the plurality of gateway devices;

a tunnel establishing unit that connects between the first terminal and each of other terminals that uses the first gateway device, via a tunnel; and a path control unit that performs a path control, such that, when a second gateway device used by a second terminal that is a communication destination of the first terminal is same as the first gateway device, traffic from the first terminal to the second terminal is routed through a tunnel between the first terminal and the second terminal, and when the second gateway device is different from the first gateway device, traffic from the first terminal to the second terminal is routed through the predetermined network.

Advantageous Effects of Invention

According to the disclosed techniques, it is possible to provide techniques for improving quality between a plurality of branches in a connection manner that varies according to an arrangement of a plurality of branches intended for the connection, in implementing a network connection between the plurality of branches.

BRIEF DESCRIPTION OF DRAWINGS

FIG. 6 is a diagram illustrating quality data of GW (Gateway) s with respect to a VPN terminal A;

FIG. 7 is a diagram illustrating a routing table of the VPN terminal A;

FIG. 8 is a diagram illustrating a routing table of a VPN gateway E;

FIG. 9 is a diagram illustrating a routing table of a VPN gateway F;

FIG. 12 is a diagram illustrating NW (Network) quality data (in the case of communicating via a backbone NW) with respect to communication between a VPN terminal A and a VPN terminal C;

FIG. 13 is a diagram illustrating NW quality data (in the case of communicating without using the backbone NW) with respect to communication between the VPN terminal A and the VPN terminal C;

FIG. 17 is a diagram illustrating a routing table of a VPN gateway E;

FIG. 22 is a diagram illustrating a routing table of a VPN terminal A;

FIG. 23 is a diagram illustrating a routing table of a VPN gateway E; and

FIG. 24 is a diagram illustrating a routing table of a VPN gateway F.

DESCRIPTION OF EMBODIMENTS

With reference to drawings, explanation will be hereinafter provided for embodiments (present embodiments) of the present invention. The following embodiments are merely examples, and embodiments applicable to the present invention are not limited to the embodiments below.

Hereafter, first to fifth embodiments are described. In the following description, a configuration according to the first embodiment is a basic configuration, and each of the second to fifth embodiments provides a configuration combined with a configuration according to the embodiment(s) described prior to the present embodiment intended for the description. However, each of the first to fifth embodiments may be carried out alone. Note that hereafter, as a device for providing an additional function, a device for providing a security function, a device for providing a WAN acceleration function, a device for implementing a closed network for a SaaS/Cloud connection, or the like is used. However, these are examples, and the device for providing an additional function is not limited thereto. For example, a device for providing a FEC (Forwarding Equivalence Class) function may be used.

First Embodiment

<Configuration of System>

Figure 1:
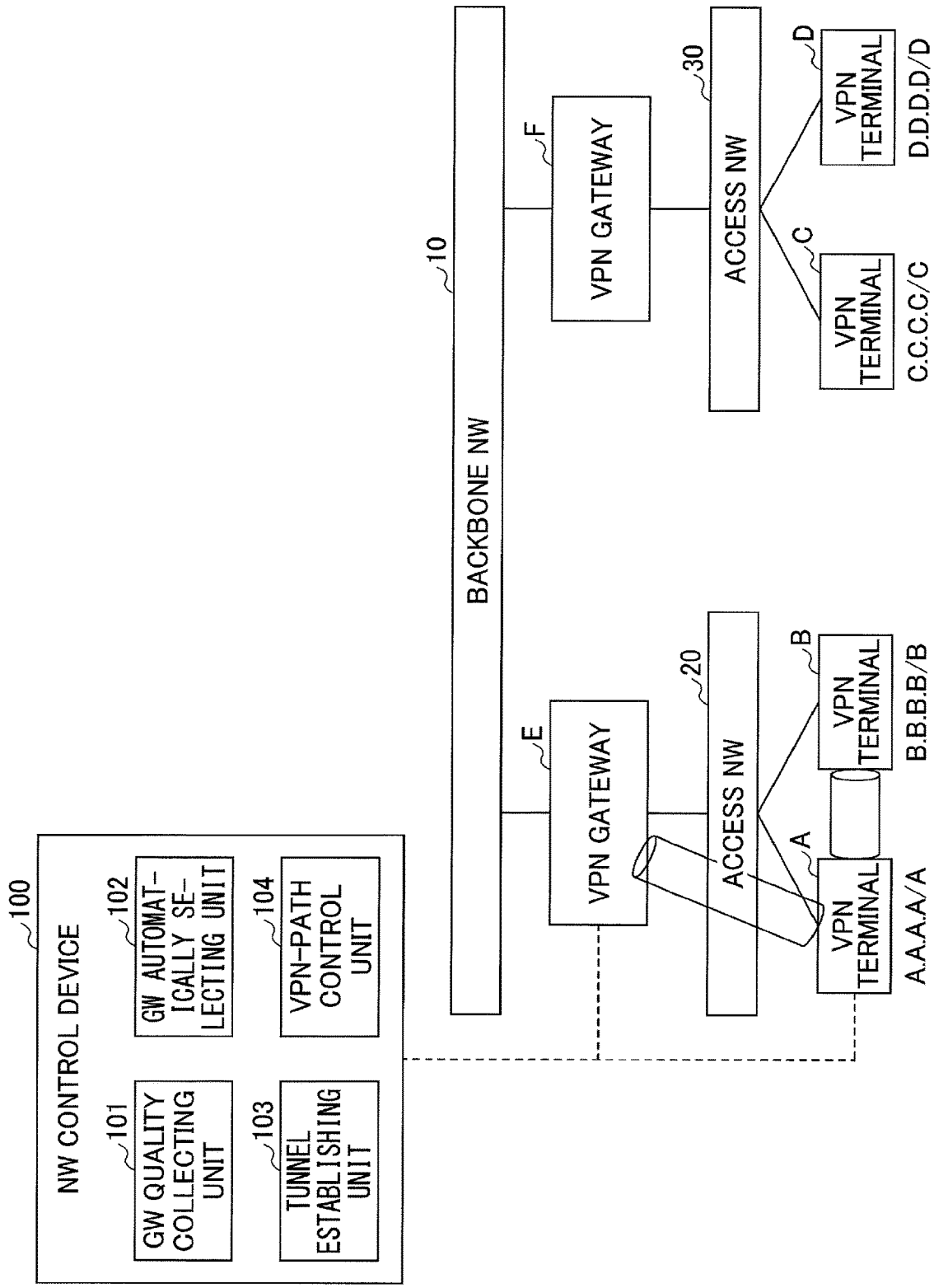
FIG. 1 is a diagram illustrating a configuration of a system according to a first embodiment.

FIG. 1 illustrates a system configuration according to the first embodiment. As illustrated in FIG. 1, the system according to the first embodiment includes VPN terminals A to D, VPN gateways E and F, and a NW control device 100. The VPN terminals A to D are coupled to access NWs 20 and 30. Also, the VPN gateways E and F are coupled to a backbone NW 10. In the system, the VPN terminals A to D, the VPN gateways E and F, the access NWs 20 and 30, and the backbone NW 10 constitute a SD-WAN NW base. Note that the "VPN gateway" may be referred to as a "GW" for short. Also, the "VPN gateway" may be referred to as a "gateway device".

In FIG. 1, IP addresses assigned to the respective VPN terminals are indicated. For example, the IP address of the VPN terminal A is A.A.A.A/A. Each VPN terminal used as a device for terminating a VPN is assumed to be located in individual branches. Each VPN terminal is a SD-WAN router, for example, and may be referred to as CPE. In the present embodiment, a system of VPNs built between VPN terminals as well as between a VPN terminal and a GW is not limited to a specific system. However, for example, a VPN employing IPsec, DTLS or the like can be used. Note that the VPN is not limited to the above systems.

Each VPN gateway is a device such as a SD-WAN router for accommodating a plurality of VPN terminals. Each VPN gateway is assumed to be mainly located in a facility provided by a carrier. However, a place where the VPN gateway is located is not limited the above example. The VPN gateway may be located in a hub branch that is provided by a cloud business operator or a company.

Each VPN terminal is coupled to a VPN gateway via an access NW. In an example of FIG. 1, the VPN terminals A and B are coupled to the VPN gateway E via the access NW 20, and the VPN terminals C and D are coupled to the VPN gateway F via the access NW 30.

The access NW is not limited to a specific NW, but includes for example, the Internet, LTE, MPLS or the like. Also, the access NW is not single, and a Hybrid NW that includes multiple types of NWs may be used.

In the present embodiment, all VPN gateways E and F are coupled to each other via the backbone NW 10. The backbone NW 10 is a NW having a high quality, such as a backbone NW using the Internet, or a MPLS network. However, the backbone NW 10 is not limited thereto. The backbone NW 10 may be referred to as an Underlay backbone NW. Each VPN terminal can communicate with other VPN terminals via a network such as the Internet, LTE or MPLS.

The NW control device 100 can communicate with each VPN gateway and each VPN terminal via a control network or the like. As an example, FIG. 1 illustrates a case in which the NW control device 100 is coupled to the VPN terminal A and the VPN gateway E, but the NW control device 100 is also coupled to other VPN terminals and VPN gateways.

As illustrated in FIG. 1, the NW control device 100 includes a GW quality collecting unit 101, a GW automatically selecting unit 102, a tunnel establishing unit 103, and a VPN-path control unit 104.

The GW quality collecting unit 101 is a functional unit that mainly collects a quality of an access NW between a VPN terminal and a VPN gateway. The GW quality collecting unit 101 collects, as quality data between the VPN terminal and the VPN gateway, a latency value, for example, but the quality data is not limited thereto. Data such as path loss, packet loss, jitter or a bandwidth may be collected.

The GW automatically selecting unit 102 is a functional unit that determines which VPN gateway is coupled to a specific VPN terminal. In the present embodiment, the GW automatically selecting unit 102 selects a VPN gateway having a highest communication quality with respect to the VPN terminal based on the quality data collected by the GW quality collecting unit 101. As an example, the GW automatically selecting unit 102 analyses latency value(s) to select a VPN gateway having minimum latency. That is, the GW automatically selecting unit 102 selects a VPN gateway that is considered to be nearest to the VPN terminal.

The tunnel establishing unit 103 is a functional unit that establishes an overlay tunnel, etc. between a corresponding VPN terminal and a VPN gateway to which the VPN terminal is coupled, as selected by the GW automatically selecting unit 102. As an example, the tunnel establishing unit 103 indicates, to the corresponding VPN terminal, identification information (e.g., IP address) of the VPN gateway to which the VPN terminal is coupled, as selected by the GW automatically selecting unit 102. The VPN terminal that has received the indication accesses the corresponding VPN gateway, so that an overlay tunnel is established between the VPN terminal and the VPN gateway. However, this is an example, and the overlay tunnel may be established in any manner. The tunnel establishing unit 103 also has a function of establishing an overlay tunnel between the VPN terminals.

The VPN-path control unit 104 controls a path, such that communication between the VPN terminals is performed via e.g., a selected VPN gateway, the backbone NW, an opposite-side VPN gateway, and a destination VPN terminal in this order. Specifically, the VPN-path control unit 104 performs a path control by providing each device with a routing table.

Figure 2:
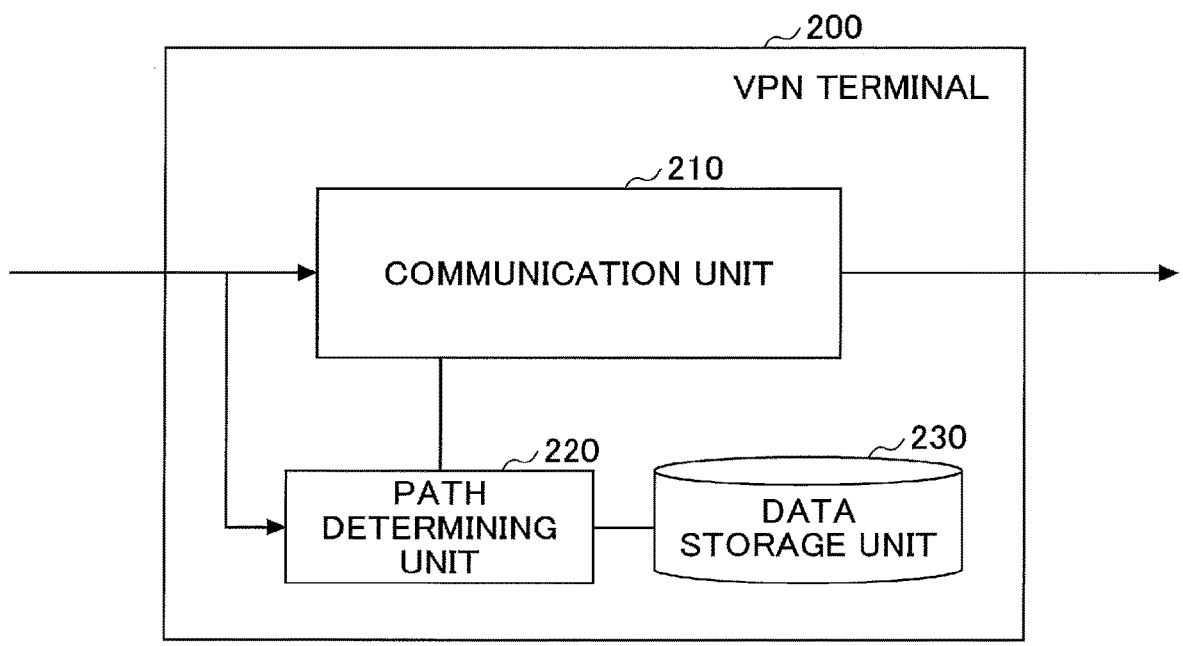
FIG. 2 is a diagram illustrating a configuration of a VPN terminal.

FIG. 2 is a diagram illustrating a functional configuration of the VPN terminal 200 used as each VPN terminal according to the present embodiment. As illustrated in FIG. 2, the VPN terminal 200 includes a communication unit 210, a path determining unit 220, and a data storage unit 230. The communication unit 210 has a function of sending an input packet toward a path determined by the path determining unit 220. The path determining unit 220 has a function of determining a sending path of a packet based on a destination IP address of the packet, a routing table and the like. The data storage unit 230 receives a routing table from the NW control device 100, and stores it.

Figure 3:
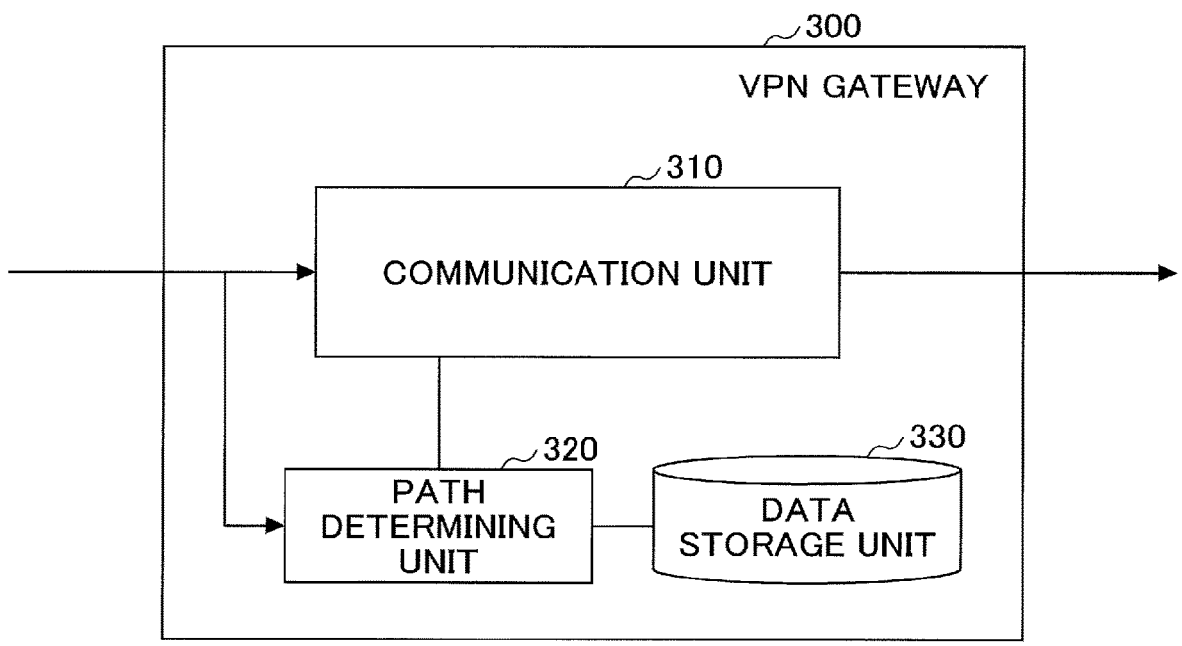
FIG. 3 is a diagram illustrating a configuration of a VPN gateway.

FIG. 3 is a diagram of a functional configuration of the VPN gateway 300 used as each VPN gateway according to the present embodiment. As illustrated in FIG. 3, the VPN gateway 300 includes a communication unit 310, a path determining unit 320, and a data storage unit 330. The communication unit 310 has a function of sending an input packet toward a path determined by the path determining unit 320. The path determining unit 320 has a function of determining a sending path of a packet based on a destination IP address of the packet, a routing table and the like. The data storage unit 330 receives a routing table from the NW control device 100, and stores it.

Each device (the NW control device 100, the VPN terminal 200 and the VPN gateway 300) described above can be implemented by causing a computer to execute a program in which processing details to be explained in the present embodiment (as with the case of the second to fifth embodiments) are described. That is, with use of a hardware resource such as a CPU and a memory equipped with a computer, a function that is included in each device can be implemented by executing a program intended for the processing performed by a corresponding device. The program can be stored or distributed by recording it in a computer readable recording medium (a portable memory, etc.). Also, the program can be provided via a network such as the Internet or e-mail.

Figure 4:
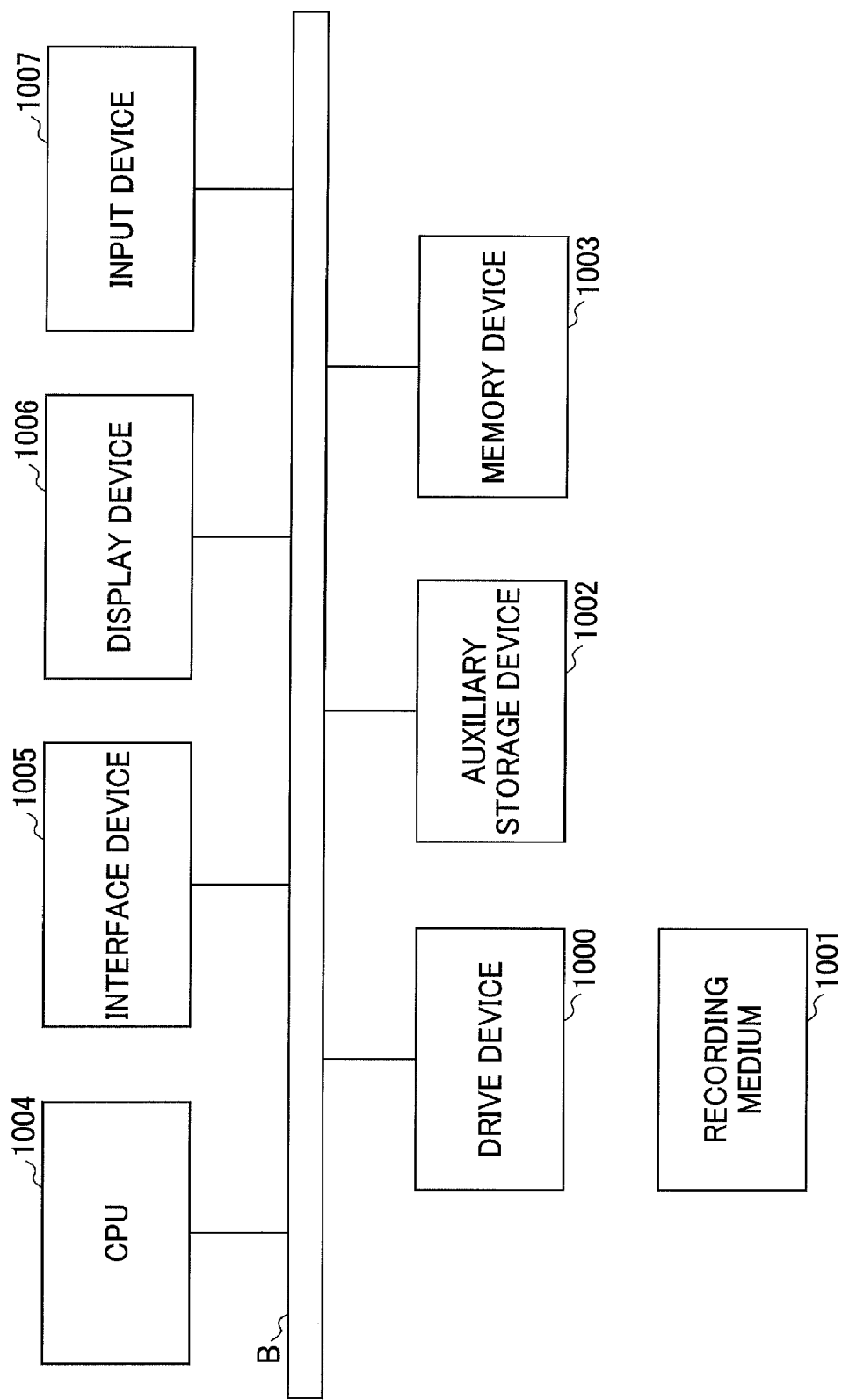
FIG. 4 is a diagram illustrating a hardware configuration of a device.

FIG. 4 is a diagram illustrating an example of a hardware configuration of the device described above. The device of FIG. 4 includes a drive device 1000, an auxiliary storage device 1002, a memory device 1003, a CPU 1004, an interface device 1005, a display device 1006, an input device 1007 and the like, which are interconnected via a bus B. Note that each device (the NW control device 100, the VPN terminal 200 and the VPN gateway 300) described above may not include the display device 1006 and the input device 1007.

A program for implementing processing available to the device is provided by a recording medium 1001 such as a CD-ROM or a memory card. When the recording medium 1001 that stores the program is set in the drive device 1000, the program is installed from the recording medium 1001 on the auxiliary storage device 1002 via the drive device 1000. However, the program is not required to be installed from the recording medium 1001, and may be downloaded from other computers via a network. The auxiliary storage device 1002 stores an installed program as well as necessary file(s) and data, etc.

In the event of an instruction to execute a program, the memory device 1003 retrieves a program from the auxiliary storage device 1002. The CPU 1004 implements a function of a corresponding device according to the program stored in the memory device 1003. The interface device 1005 is used as an interface for connecting to the Internet. The display device 1006 displays a GUI (Graphical User Interface) based on a program, or the like. The input device 1007 includes a keyboard and a mouse with either a button or a touch panel, etc. The input device 1007 is used for various operation instructions.

<Operation of System>

Figure 5:
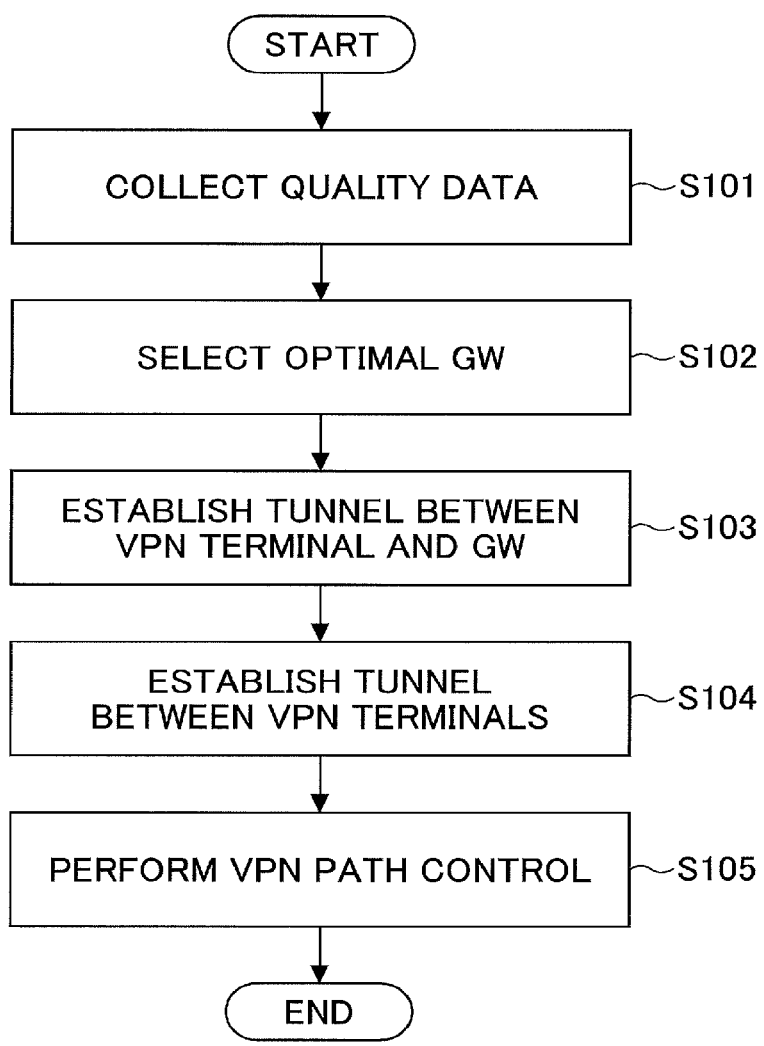
FIG. 5 is a flowchart for explaining an operation of the system according to the first embodiment.

Hereafter, with reference to steps of a flowchart of FIG. 5, explanation will be provided for an example of an operation of the system according to the present embodiment illustrated in FIG. 1.

When the VPN terminal A is coupled to an access NW, the GW quality collecting unit 101 starts collecting quality data of an access NW between the VPN terminal A and each of all connectable VPN gateways (S101). For example, the VPN terminal A may transmit a packet to a VPN gateway, receive its response to obtain quality data, and report the quality data to the GW quality collecting unit 101. Alternatively, the VPN gateway may obtain quality data to report it to the GW quality collecting unit 101. Other ways may be adopted.

The GW quality collecting unit 101 stores, in a memory or the like, the collected quality data, which has an internal data structure as illustrated in an example of FIG. 6. In the example of FIG. 6, latency values between the VPN terminal A and the VPN gateways E and F are indicated. Note that the latency values used as the quality data are measured and stored, by way of example. For example, as the quality data, path loss, jitter or packet loss may be measured and stored. Also, multiple types of quality data (e.g., latency, path loss, jitter and packet loss) may be measured and stored.

Next, the GW automatically selecting unit 102 selects, as a GW to which the VPN terminal A is coupled, an optimal GW based on the quality data collected by the GW quality collecting unit 101 (S102). As a selection criterion, a VPN gateway that has a highest quality with respect to an access NW between the VPN terminal A and the VPN gateway is selected. In the case of the quality data illustrated in FIG. 6, because the latency between the VPN gateway E and the VPN terminal A is minimum, the VPN gateway E is selected as the optimal GW. Note that in this case, because the latency is used as the quality, a GW having minimum latency is selected as the GW having a highest quality. However, this is merely an example. For example, in a case where path loss is used as the quality, the GW automatically selecting unit 102 selects a GW having minimum path loss as the GW having a highest quality. In a case where packet loss is used as the quality, the GW automatically selecting unit 102 selects a GW having minimum packet loss as the GW having a highest quality. In a case where jitter is used as the quality, the GW automatically selecting unit 102 selects a GW having minimum jitter as the GW having a highest quality. Note that, with respect to the quality, all of the examples described above indicate that a smaller value means a higher quality. With respect to the quality, in a case of using a larger value in accordance with a higher quality, the GW automatically selecting unit 102 selects, as the GW having a highest quality, a GW having a maximum quality.

Also, in a case where a plurality of types of quality are used, for example, the GW automatically selecting unit 102 may select, as a VPN gateway having a highest quality, a GW for which a value obtained by multiplying respective weights by quality is minimum (or maximum). For example, in a case where three types of quality are set as Q1, Q2 and Q3, and further, respective weights intended for the multiplication with quality are set as W1, W2 and W3, a value obtained through multiplication with both the corresponding weight and quality is expressed by "W1×Q1+W2×Q2+W3×Q3".

When the GW automatically selecting unit 102 selects a GW, the tunnel establishing unit 103 establishes an overlay tunnel between the VPN terminal A and the selected GW (in this case, the VPN gateway E) (S103). As the overlay tunnel, various existing techniques such as IPsec or DTLS can be used to establish a tunnel. Note that a connection between the VPN terminal A and the selected GW may be implemented in a connection manner other than the overlay tunnel. The overlay tunnel may be referred to as a tunnel.

Next, the tunnel establishing unit 103 also establishes an overlay tunnel between the VPN terminal A and another VPN terminal that is downstream coupled to the selected GW (in this case, the VPN gateway E) (i.e., another VPN terminal coupled to the VPN gateway E through a tunnel) (S104). Note that a connection between the VPN terminal A and another VPN terminal may be implemented in a connection manner other than the overlay tunnel.

The VPN-path control unit 104 performs a path control of a VPN (S105). Under the path control, in a case of communication between VPN terminals that are downstream coupled to a same GW, the VPN-path control unit 104 controls a path such that communication is performed via the overlay tunnel between the VPN terminals. In contrast, in a case where communication between VPN terminals that are downstream coupled to a different GW, the VPN-path control unit 104 controls a path such that communication is performed via the backbone NW 10. The path control is performed by the VPN-path control unit 104 that sets a routing table with respect to a given device.

As an example, FIG. 7 illustrates a routing table set by the VPN terminal A. In accordance with the routing table illustrated in FIG. 7, for example, the packet whose destination is C.C.C.C/C is transferred to the VPN gateway E. Also, the packet whose destination is the IP address B.B.B.B/ of the VPN terminal B, which is downstream coupled to the same GW, is transferred to the VPN terminal B via the tunnel.

As an example, FIG. 8 illustrates a routing table set by the VPN gateway E. In accordance with the routing table illustrated in FIG. 8, for example, the packet whose destination is C.C.C.C/C is transferred to the VPN gateway F.

As an example, FIG. 9 illustrates a routing table set by the VPN gateway F. In accordance with the routing table illustrated in FIG. 9, for example, the packet whose destination is C.C.C.C/C is transferred to the VPN terminal C.

By setting the routing tables illustrated in FIGS. 7 to 9, communication from the VPN terminal A to the VPN terminal C is performed via the VPN gateways E and F. Note that in the present embodiment (as with the case of other embodiments), explanation has been provided for the case where traffic sent from the VPN terminal A is the focus. However, similarly, traffic in a case where the VPN terminal A performs reception can be controlled as well.

Second Embodiment

Next, the second embodiment is described. The second embodiment is an embodiment in which a dynamic VPN-path control function is added to the first embodiment. Hereafter, a configuration and an operation added to the first embodiment are mainly described.

Figure 10:
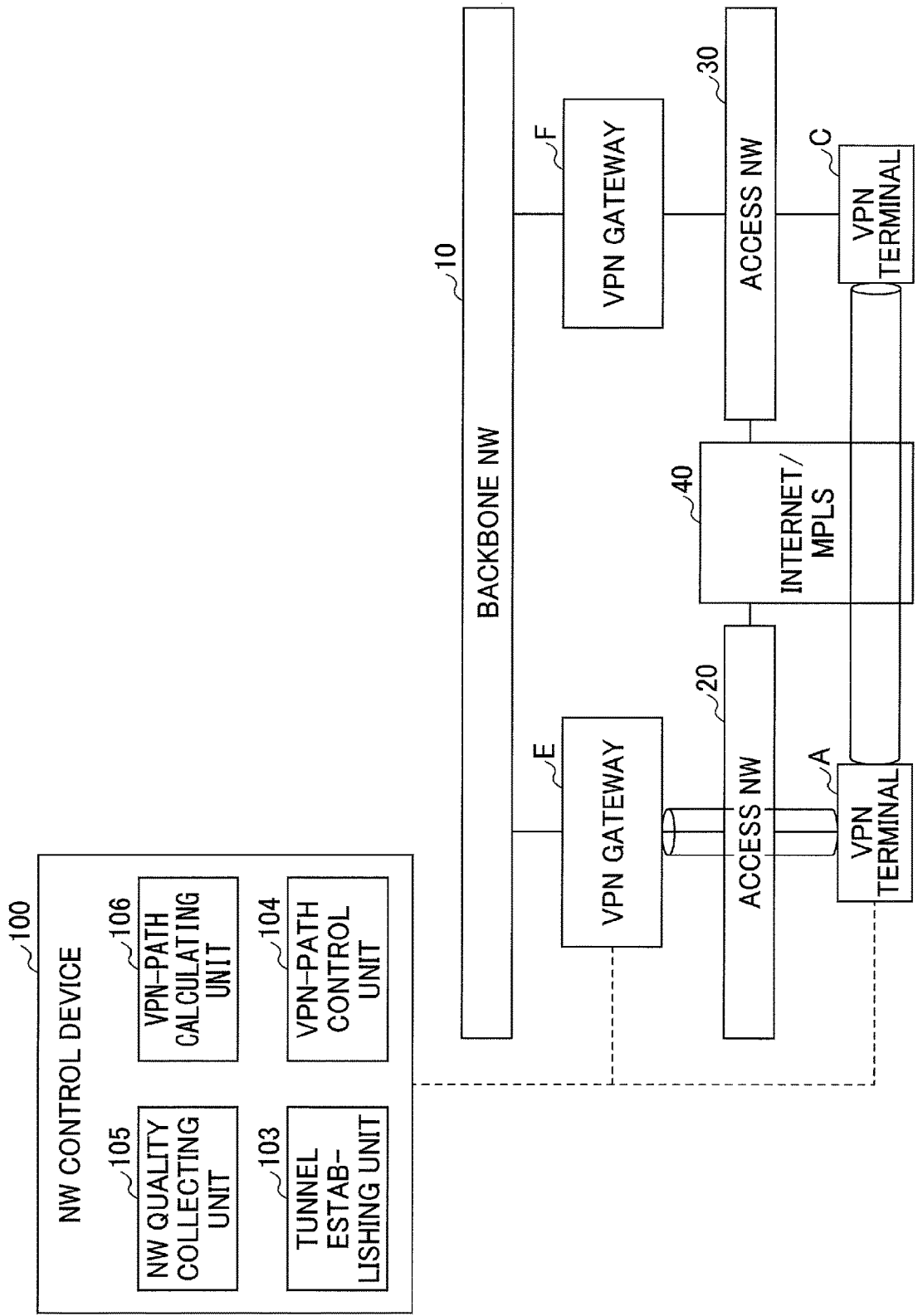
FIG. 10 is a diagram illustrating a configuration of a system according to a second embodiment.

As illustrated in FIG. 10, in the SD-WAN NW base, the Internet network or a MPLS network (Internet/MPLS 40 in this figure) for coupling between the access NWs is added.

The NW control device 100 further includes a NW quality collecting unit 105 and a VPN-path calculating unit 106. The tunnel establishing unit 103 and the VPN-path control unit 104 perform an additional operation other than the first embodiment. Note that in the NW control device 100 of FIG. 10, only functional units relating to an operation to be described in the present embodiment are indicated.

Figure 11:
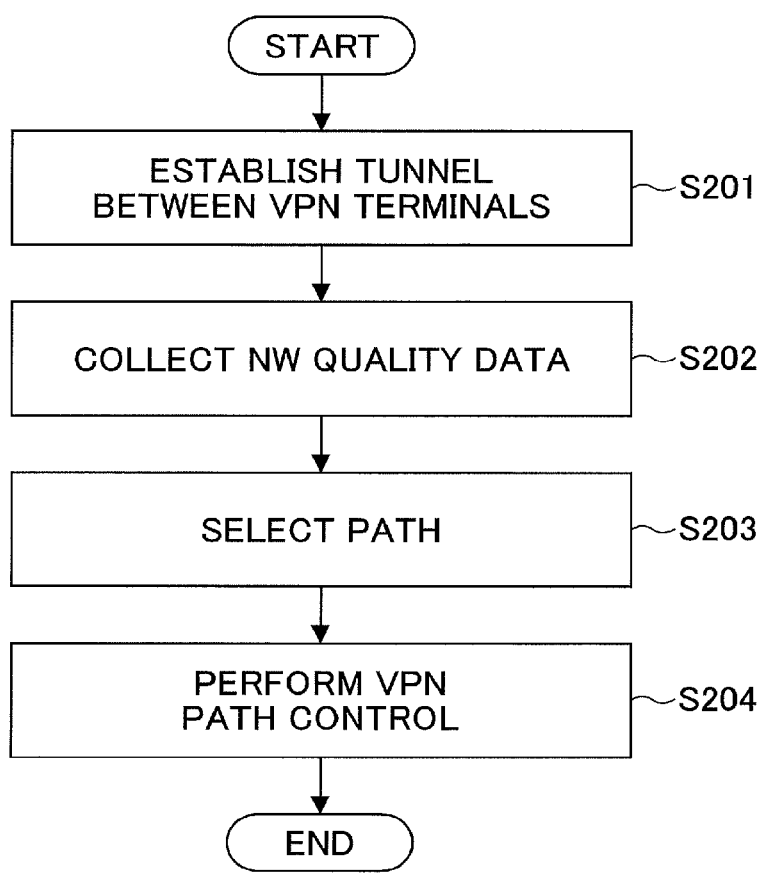
FIG. 11 is a flowchart for explaining an operation of the system according to the second embodiment.

With reference to steps of a flowchart of FIG. 11, explanation will be provided below for an operation example of a system according to the second embodiment. This description premises a case where the GW selection, the establishment of the tunnel between the VPN terminal and the GW, and the establishment of the tunnel between the VPN terminals that are downstream coupled to the same GW, as described in the first embodiment, are completed.

In the second embodiment, in order to perform a dynamic VPN path control, even if a VPN terminal and an opposite-side VPN terminal are downstream coupled to a different GW, the tunnel establishing unit 103 establishes an overlay tunnel between the VPN terminal and the opposite-side VPN gateway (S201). Note that a connection between the VPN terminal and the opposite-side VPN gateway may be implemented in a connection manner other than the overlay tunnel.

In FIG. 10, the established overlay tunnel is indicated between the VPN terminal A and the VPN terminal C.

Also, the NW quality collecting unit 105 collects NW quality data with respect to end-to-end (in this example, between the VPN terminal A and the VPN terminal C) (S202). The NW quality collecting unit 105 collects two types of NW quality data that includes NW quality data in the case of communicating via the backbone NW 10, and NW quality data in the case of communicating without using the backbone NW 10.

As an example, FIGS. 12 and 13 illustrate NW quality data collected and maintained by the NW quality collecting unit 105.

FIG. 12 illustrates NW quality data (in this example, latency values) with respect to communication between the VPN terminal A and the VPN terminal C in the case of communicating via the backbone NW 10. FIG. 13 illustrates NW quality data with respect to communication between the VPN terminal A and the VPN terminal C in the case of communicating without using the backbone NW 10. Note that collecting the latency value used as the NW quality data is merely an example, and other values may be collected.

As illustrated in FIG. 12, in the case of communicating via the backbone NW 10, as the NW quality data with respect to communication between the VPN terminal A and the VPN terminal C, quality data between the VPN terminal A and the VPN gateway E, quality data between the VPN gateway E and the VPN gateway F, and quality data between the VPN gateway F and the VPN terminal C are collected, and are maintained by the NW quality collecting unit 105.

On the other hand, as illustrated in FIG. 13, in the case of communicating without using the backbone NW 10, only quality data of the overlay network between the VPN terminal A and the VPN terminal C is collected and is maintained by the NW quality collecting unit 105.

Next, with respect to communication between the VPN terminal A and the VPN terminal C, the VPN-path calculating unit 106 selects either communication performed via the backbone NW 10 or communication performed directly via the overlay tunnel between the VPN terminals, based on the NW quality data collected by the NW quality collecting unit 105 (S203).

In a case where the NW quality data illustrated in FIGS. 12 and 13 is obtained, "10 ms+100 ms+20 ms (in the case of communicating via the backbone NW 10)>100 ms (in the case of communicating without using the backbone NW 10)" is defined. In other words, latency in the case of communicating via the backbone NW 10 is larger than the case of the communicating without using the backbone NW 10. Thereby, the VPN-path calculating unit 106 determines to directly couple the VPN terminal A to the VPN terminal C, and selects a path (tunnel path) for directly coupling the VPN terminal A to the VPN terminal C.

The VPN-path control unit 104 performs a VPN path control based on the result of the selection described above (S204). Specifically, a routing table including an entry, in which a next-hop of a packet whose destination is C.C.C.C/C is the VPN terminal C, is set.

Third Embodiment

Next, the third embodiment is described. For conventional WANs or the like used in companies, security problems have been identified. Since an exit to the Internet is generally located in a hub branch, security measures on a branch base side are not substantially taken into account. In contrast, various attacks from the outside are assumed to be increased. The present embodiment solves such a security problem.

The third embodiment is an embodiment in which a security function is added on a PoP (Point of Presence) side with respect to the first embodiment or the second embodiment. Hereafter, a configuration and an operation added to the first embodiment or the second embodiment are mainly described. Note that instead of the "PoP side", a "VPN gateway side" may be used.

Figure 14:
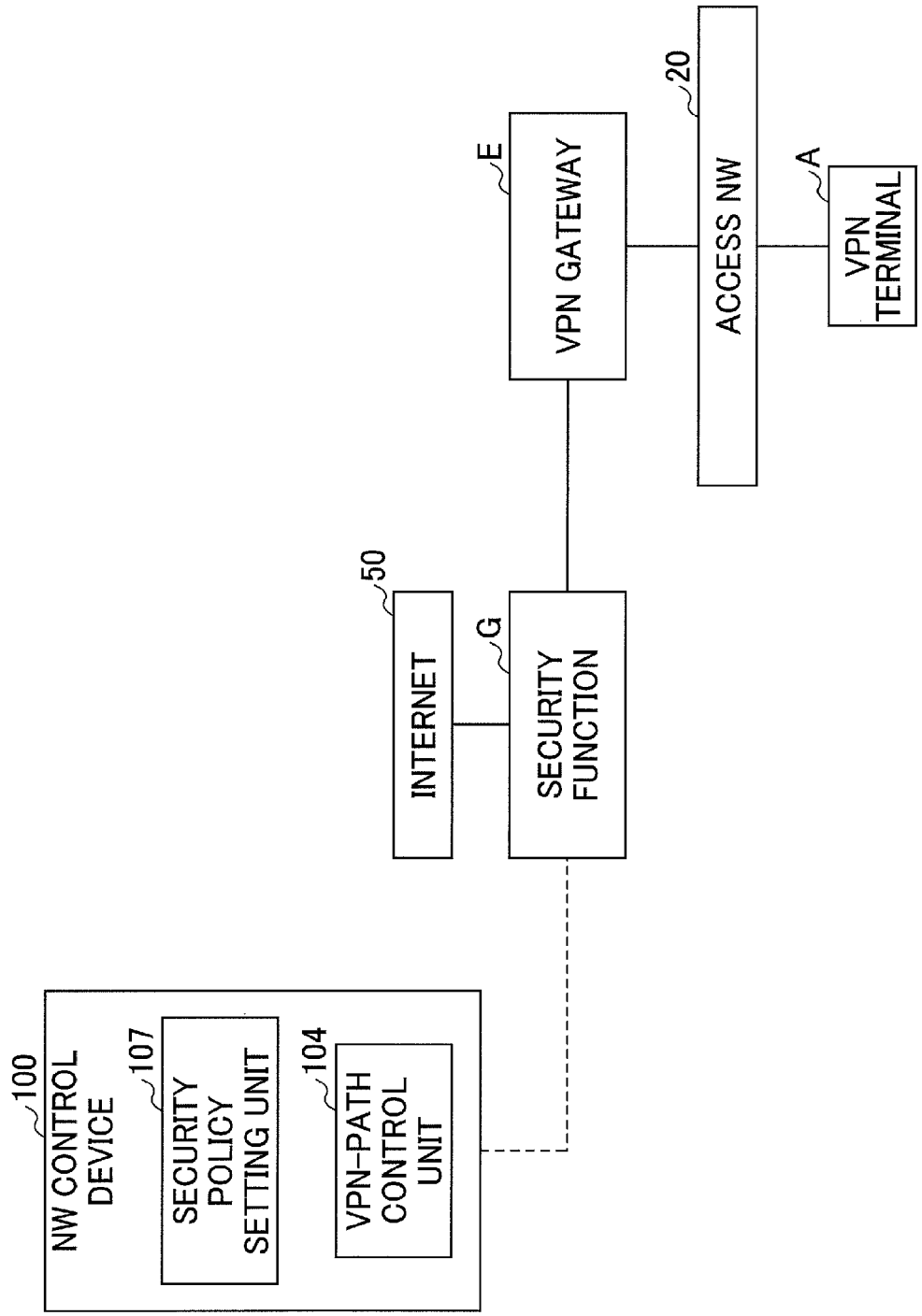
FIG. 14 is a diagram illustrating a configuration of a system according to a third embodiment.

As illustrated in FIG. 14, a security function G is added between the VPN gateway E and the Internet 50. Note that the security function may be added to all VPN gateways, or be added to a part of the VPN gateways.

The NW control device 100 further includes a security policy setting unit 107. The VPN-path control unit 104 performs an additional operation other than the first embodiment or the second embodiment. Note that in the NW control device 100 of FIG. 14, only functional units relating to an operation to be described in the present embodiment are indicated.

The security function G is not limited to a specific function, but is implemented by a device that has a function such as a FW, Proxy or Anti-Virus that is commercially available, or a device that has a customized special security function, or the like. Note that the security function G may be implemented by a functional unit equipped with the VPN gateway E.

Figures 15, 16:
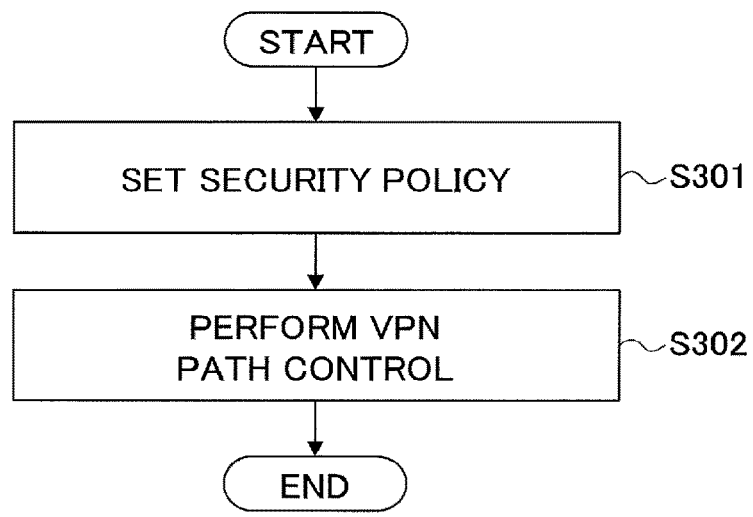
FIG. 15 is a flowchart for explaining an operation of the system according to the third embodiment.
FIG. 16 is a diagram illustrating a routing table of a VPN terminal A.

With reference to steps of a flowchart of FIG. 15, explanation will be provided for an operation example of a system according to the third embodiment.

In order to implement a secure Internet access, an end user sets a necessary security policy in the security function G by using the security policy setting unit 107 (S301). The security policy includes, for example, a FW rule, URL, a blacklist for filtering, or the like, but is not limited thereto. Any security policy may be set.

Following the setting, the VPN-path control unit 104 controls a VPN path, such that traffic for the Internet 50 is routed through the VPN gateway E and the security function G (S302).

As an example, FIG. 16 illustrates a routing table which the VPN-path control unit 104 sets in the VPN terminal A. As an example, FIG. 17 illustrates a routing table which the VPN-path control unit 104 sets in the VPN gateway E. In FIGS. 16 and 17, a packet whose destination is 0.0.0.0/0 indicates a packet for the Internet 50.

In accordance with the path setting of FIGS. 16 and 17, traffic from the VPN terminal A to the Internet 50 is routed through the VPN gateway E and the security function G.

Fourth Embodiment

Next, the fourth embodiment is described. The fourth embodiment is an embodiment in which a WAN acceleration function is added to the first embodiment, the second embodiment, or the third embodiment. Hereafter, a configuration and an operation added to the first embodiment, the second embodiment or the third embodiment are mainly described.

Figure 18:
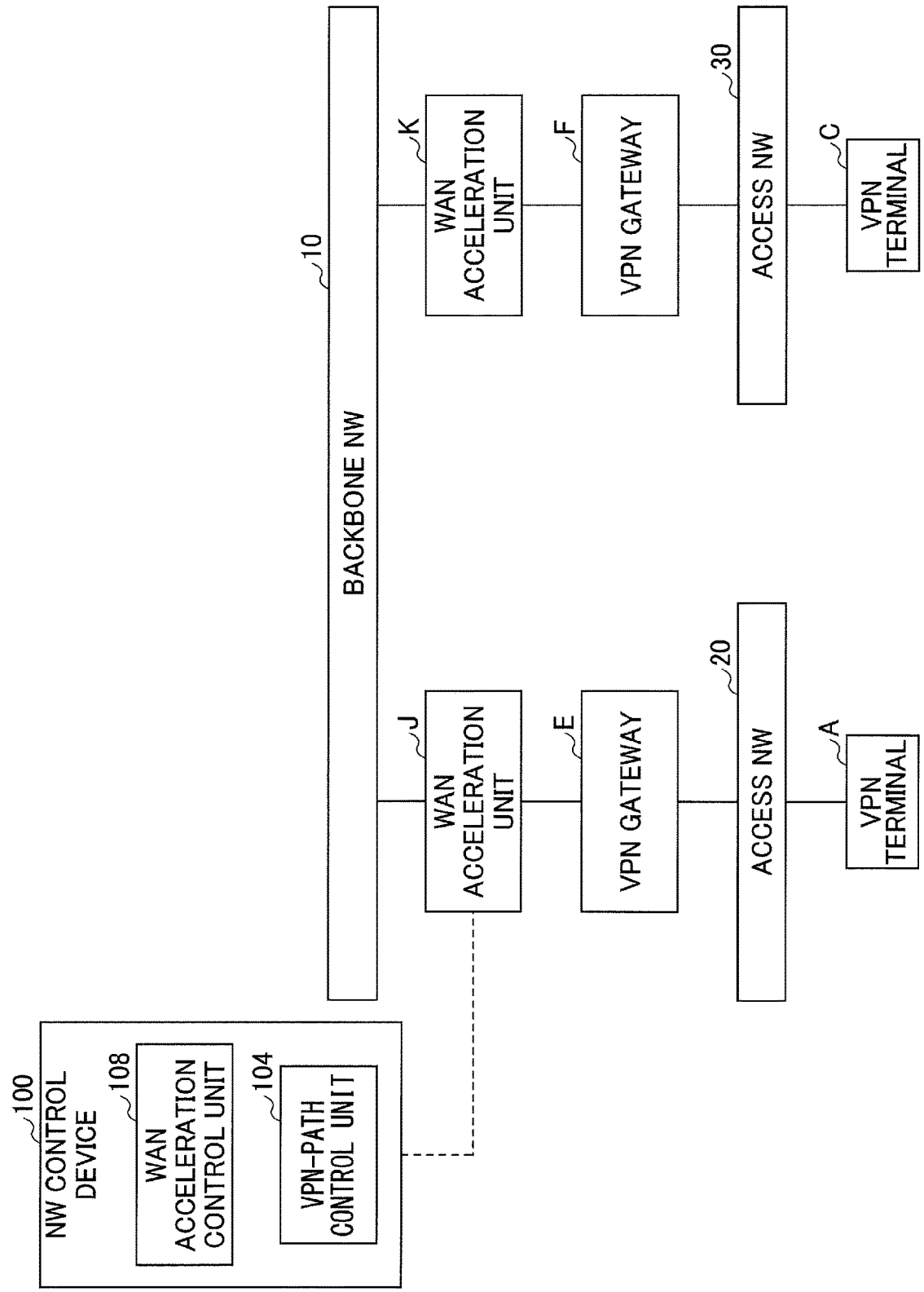
FIG. 18 is a diagram illustrating a configuration of a system according to a fourth embodiment.

As illustrated in FIG. 18, a WAN acceleration function J is added between the VPN gateway E and the backbone NW 10, and a WAN acceleration function K is added between the VPN gateway F and the backbone NW 10. Note that the WAN acceleration function may be added to all VPN gateways, or be added to a part of VPN gateways.

The NW control device 100 further includes a WAN acceleration control unit 108. The VPN-path control unit 104 performs an additional operation other than the first embodiment, the second embodiment or the third embodiment. Note that in the NW control device 100 of FIG. 18, only functional units relating to an operation to be described in the present embodiment are indicated.

The WAN acceleration functions J and K can be implemented by a commercially available WAN acceleration device, for example. Alternatively, a device that includes a customized special WAN acceleration function may be used.

Figures 19, 20:
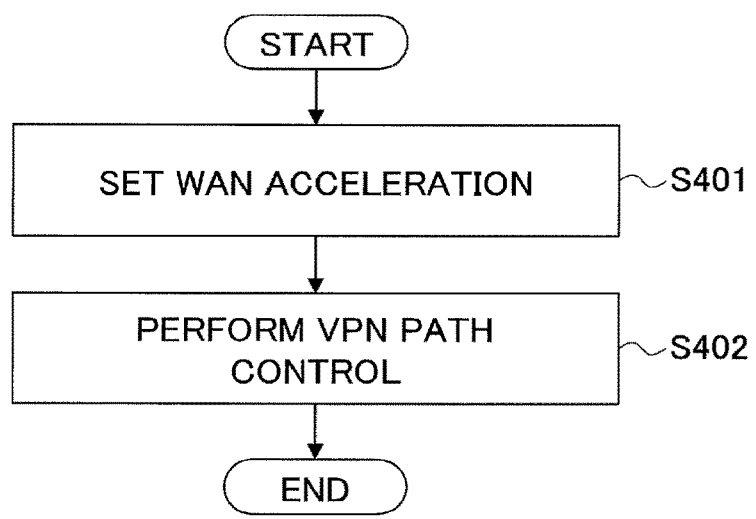
FIG. 19 is a flowchart for explaining an operation of the system according to the fourth embodiment.
FIG. 20 is a diagram illustrating a routing table of a VPN gateway E.

With reference to steps of a flowchart of FIG. 19, explanation will be provided for an operation example of a system according to the fourth embodiment.

In order to further accelerate communication between the VPN gateways E and F, an end user sets a necessary acceleration policy in the WAN acceleration function J (and/or the WAN acceleration function K), by using the WAN acceleration control unit 108 (S401). The acceleration policy includes, for example, an IP address, a cache size, or/and a protocol type, etc. with respect to an opposite-side device that is peer, but is not limited thereto. All policies for a WAN acceleration may be subjects for the setting.

Following the setting, the VPN-path control unit 104 controls a VPN path, such that traffic via the backbone NW 10 is routed through the WAN acceleration function J (S402).

As an example, FIG. 20 illustrates a routing table which the VPN-path control unit 104 sets in the VPN gateway E. In accordance with the path setting of FIG. 20, traffic between the VPN terminal A and the VPN terminal C is routed through the WAN acceleration function J.

Fifth Embodiment

Next, the fifth embodiment is described. The fifth embodiment is an embodiment in which a configuration for speeding up an access to SaaS or the cloud is added to the first embodiment, the second embodiment, the third embodiment, or the fourth embodiment. Hereafter, a configuration and an operation added to the first embodiment, the second embodiment, the third embodiment, or the fourth embodiment are mainly described.

Figure 21:
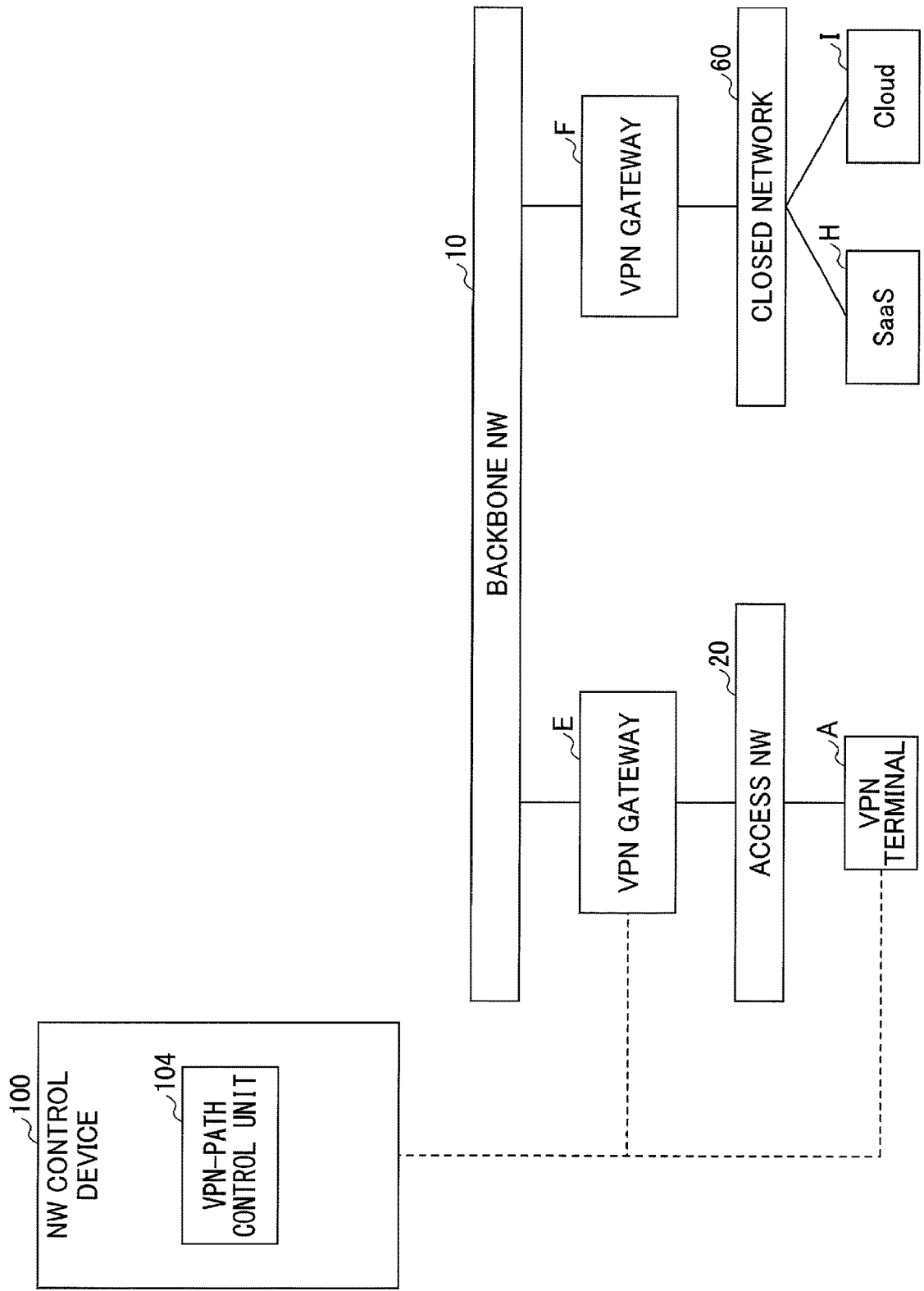
FIG. 21 is a diagram illustrating a configuration of a system according to a fifth embodiment.

As illustrated in FIG. 21, a closed network 60 for implementing a closed connection between a VPN gateway F and both of a SaaS-H and Cloud I is downstream coupled to the VPN gateway F. Note that the closed network 60 may be additionally coupled to the access NW 30 that is coupled to the VPN gateway F. Alternatively, without using the access NW 30, the closed network 60 may be coupled. The closed network coupled to the SaaS-H or the Cloud I, etc. may also be referred to as a Direct Connect network. The closed network 60 is implemented by a device relating to existing techniques, which includes a transmission device that constitutes a network such as VLAN or MPLS.

In the present embodiment, in order to accelerate communication between the VPN terminal A and the SaaS-H/Cloud I, the VPN-path control unit 104 controls a path, such that communication between the VPN terminal A and either the SaaS-H or the Cloud I is routed through the backbone NW 10.

As an example, FIG. 22 illustrates a routing table that the VPN-path control unit 104 sets in the VPN terminal A. As an example, FIG. 23 illustrates a routing table that the VPN-path control unit 104 sets in the VPN gateway E. As an example, FIG. 24 illustrates a routing table that the VPN-path control unit 104 sets in the VPN gateway F. In FIGS. 22 to 24, H.H.H.H/H indicates an IP address of the SaaS-H, and I.I.I.I/I indicates an IP address of the Cloud I.

In accordance with the path setting of FIGS. 22 to 24, traffic from the VPN terminal A to the SaaS-H as well as traffic from the VPN terminal A to the Cloud I are routed through the backbone NW 10.

Effect, Etc. Of the Embodiments

As described above, the techniques described in the specification utilize the Underlay NW base for a carrier with respect to the Internet backbone or MPLS, etc. to improve quality of communication between branches, with use of an optimal combination of the Underlay NW and the overlay NW.

In view of the point described above, in order to make best use of the aforementioned Underlay NW, the nearest access point (PoP) to a branch is automatically selected. Further, with respect to the PoP, secure Internet access or various values added for acceleration between PoPs can be provided, in conjunction with a security function and/or a WAN acceleration function, etc.

Also, by utilizing the various Underlay connections with Cloud/SaaS, including the closed network (Direct connect, etc.), quality of communication between a branch and the cloud as well as quality of communication between a branch and SaaS can be improved.

That is, such techniques make best use of the Underlay NW base for the carrier whereby it is possible to provide a corporate user with a secure WAN NW having a high quality, compared to an existing SD-WAN solution.

SUMMARY OF THE EMBODIMENTS

The following techniques are disclosed in the specification:

(First Item)

A network control device for performing control of a system including a plurality of terminals and including a plurality of gateway devices that are coupled to a predetermined network, comprising:

a selection unit that selects a first gateway device used by a first terminal based on a quality between the first terminal and the plurality of gateway devices;

a tunnel establishing unit that connects between the first terminal and each of other terminals that uses the first gateway device, via a tunnel; and a path control unit that performs a path control, such that, when a second gateway device used by a second terminal that is a communication destination of the first terminal is same as the first gateway device, traffic from the first terminal to the second terminal is routed through a tunnel between the first terminal and the second terminal, and when the second gateway device is different from the first gateway device, traffic from the first terminal to the second terminal is routed through the predetermined network.

Note that the GW automatically selecting unit 102 is an example of the selection unit described above. The tunnel establishing unit 103 is an example of the tunnel establishing unit described above. The VPN-path control unit 104 is an example of the path control unit described above.

(Second Item)

A network control device that performs control of a system including a plurality of gateway devices that are coupled to a predetermined network, and a plurality of terminals, comprising:

a selection unit that selects a first gateway device used by a first terminal based on a quality between the first terminal and the plurality of gateway devices; and a path control unit that performs a path control, such that,
when a second gateway device used by a second terminal that is a communication destination of the first terminal is same as the first gateway device, traffic from the first terminal to the second terminal is routed without using the predetermined network, and
when the second gateway device is different from the first gateway device, as a path for traffic routed from the first terminal to the second terminal, either of a first path via the predetermined network or a second path without using the predetermined network is selected based on a quality of the first path as well as a quality of the second path, and the traffic from the first terminal to the second terminal is routed along the selected path.

Note that the GW automatically selecting unit 102 is an example of the selection unit described above. The VPN-path control unit 104 and the VPN-path calculating unit 106 are an example of the path control unit described above. In the configuration in the second item, the network control device further includes a tunnel establishing unit that connects between the first terminal and each of other terminals that uses the first gateway device, via a tunnel, and the path control unit may perform a path control, such that, when a second gateway device used by a second terminal that is a communication destination of the first terminal is same as the first gateway device, traffic from the first terminal to the second terminal is routed through a tunnel between the first terminal and the second terminal.

(Third Item)

The network control device according to item 1 or 2, wherein the selection unit selects, as the first gateway device, a gateway having a highest quality with respect to the first terminal, from among the plurality of gateway devices.

(Fourth Item)

The network control device according to any one of items 1 through 3, wherein the system may include a device for providing an additional function, and the path control unit performs the path control such that the traffic from the first terminal is routed through the device for providing an additional function.

(Fifth Item)

A communication system, comprising the network control device according to any one of items 1 through 4, a plurality of gateway devices that are coupled to a predetermined network, and a plurality of terminals.

(Sixth Item)

A network control method performed by a network control device that performs control of a system including a plurality of terminals and including a plurality of gateway devices that are coupled to a predetermined network, comprising:

a selection step of selecting a first gateway device used by a first terminal based on a quality between the first terminal and the plurality of gateway devices;

a tunnel establishing step of connecting between the first terminal and each of other terminals that uses the first gateway device, via a tunnel; and a path control step of performing a path control, such that, when a second gateway device used by a second terminal that is a communication destination of the first terminal is same as the first gateway device, traffic from the first terminal to the second terminal is routed through a tunnel between the first terminal and the second terminal, and when the second gateway device is different from the first gateway device, traffic from the first terminal to the second terminal is routed through the predetermined network.

(Seventh Item)

A program causing a computer to implement each unit in the network control device according to any one of items 1 through 4.

(Eighth Item)

A computer readable recording medium recording the program according to item 7.

As described above, the present embodiments have been explained, but the present invention is not limited to a specific embodiment. Various modifications or/and changes to the embodiments can be made within the scope of the present invention described in the claims.

REFERENCE SIGNS LIST 10 backbone NW
20, 30 access NW
40 Internet/MPLS
50 Internet
60 closed network
100 NW control device
101 GW quality collecting unit
102 GW automatically selecting unit
103 tunnel establishing unit
104 VPN-path control unit
105 NW quality collecting unit
106 VPN-path calculating unit
107 security policy setting unit
108 WAN acceleration control unit
200, A to D VPN terminal
210 communication unit
220 path determining unit
230 data storage unit
300, E, F VPN gateway
310 communication unit
320 path determining unit
330 data storage unit
H SaaS
I Cloud
J, K WAN acceleration function
G security function
1000 drive device
1001 recording medium
1002 auxiliary storage device
1003 memory device
1004 CPU
1005 interface device
1006 display device
1007 input device

The invention claimed is:

1. A network control device for performing control of a system including a plurality of terminals and including a plurality of gateway devices that are electrically coupled to a predetermined network, comprising:

processing circuitry configured to:

select a first gateway device used by a first terminal based on a quality between the first terminal and the plurality of gateway devices;

connect between the first terminal and each of other terminals that uses the first gateway device, via a tunnel; and perform a path control, such that, upon determining that a second gateway device used by a second terminal that is a communication destination of the first terminal is same as the first gateway device, traffic from the first terminal to the second terminal is routed, without using the predetermined network, through a tunnel established between the first terminal and the second terminal, and such that, upon determining that the second gateway device is different from the first gateway device, traffic from the first terminal to the second terminal is routed through the predetermined network.

2. The network control device according to claim 1, wherein the processing circuitry is configured to select, as the first gateway device, a gateway device having a highest quality with respect to the first terminal, from among the plurality of gateway devices.

3. The network control device according to claim 1, wherein the system includes a device for providing an additional function(s), and the processing circuitry is configured to perform the path control such that the traffic from the first terminal is routed through the device for providing an additional function.

4. A communication system, comprising the network control device according to claim 1, a plurality of gateway devices that are electrically coupled to a predetermined network, and a plurality of terminals.

5. A non-transitory computer readable recording medium recording a program that causes a computer to implement each unit in the network control device according to claim 1.

6. A network control device that performs control of a system including a plurality of gateway devices that are electrically coupled to a predetermined network, and a plurality of terminals, comprising:
processing circuitry configured to:
select a first gateway device used by a first terminal based on a quality between the first terminal and the plurality of gateway devices; and
perform a path control, such that,
upon determining that a second gateway device used by a second terminal that is a communication destination of the first terminal is same as the first gateway device, traffic from the first terminal to the second terminal is routed without using the predetermined network, through a tunnel established between the first terminal and the second terminal, and
upon determining that the second gateway device is different from the first gateway device, as a path for traffic routed from the first terminal to the second terminal, either of a first path via the predetermined network or a second path without using the predetermined network is selected based on a quality of the first path as well as a quality of the second path, and the traffic from the first terminal to the second terminal is routed along the selected path.

7. The network control device according to claim 6, wherein the processing circuitry is configured to select, as the first gateway device, a gateway device having a highest quality with respect to the first terminal, from among the plurality of gateway devices.

8. The network control device according to claim 6, wherein the system includes a device for providing an additional function(s), and the processing circuitry is configured to perform the path control such that the traffic from the first terminal is routed through the device for providing an additional function.

9. A communication system, comprising the network control device according to claim 6, a plurality of gateway devices that are electrically coupled to a predetermined network, and a plurality of terminals.

10. A network control method performed by a network control device that performs control of a system including a plurality of terminals and including a plurality of gateway devices that are electrically coupled to a predetermined network, comprising:
selecting a first gateway device used by a first terminal based on a quality between the first terminal and the plurality of gateway devices;
connecting between the first terminal and each of other terminals that uses the first gateway device, via a tunnel; and
performing a path control, such that, upon determining that a second gateway device used by a second terminal that is a communication destination of the first terminal is same as the first gateway device, traffic from the first terminal to the second terminal is routed, without using the predetermined network, through a tunnel established between the first terminal and the second terminal, and such that, upon determining that the second gateway device is different from the first gateway device, traffic from the first terminal to the second terminal is routed through the predetermined network.

* * * * *